United States Patent [19]
Oguchi

[11] Patent Number: 5,351,072
[45] Date of Patent: Sep. 27, 1994

[54] AUTOMATIC LEAD SUPPLY APPARATUS FOR PLOTTER

[75] Inventor: Hiroshi Oguchi, Tokyo, Japan

[73] Assignee: Mutoh Industries Ltd., Tokyo, Japan

[21] Appl. No.: 726,178

[22] Filed: Jul. 5, 1991

[30] Foreign Application Priority Data

Aug. 28, 1990 [JP] Japan ................................ 2-225586

[51] Int. Cl.⁵ .................................................. G01D 15/16
[52] U.S. Cl. ............................... 346/139 C; 346/139 R
[58] Field of Search ...................... 346/139 C, 139 R; 33/18.1, 18.2

[56] References Cited

U.S. PATENT DOCUMENTS

| | | | |
|---|---|---|---|
| 4,905,016 | 2/1990 | Kobayashi | 346/139 C |
| 4,991,300 | 2/1991 | Takahashi | 346/139 C |
| 5,150,525 | 9/1992 | Iai | 346/139 C |

FOREIGN PATENT DOCUMENTS

| | | | |
|---|---|---|---|
| 61-132394 | 6/1986 | Japan . | |
| 1-317790 | 12/1989 | Japan | 33/18.1 |
| 3-169699 | 7/1991 | Japan . | |
| 3-169700 | 7/1991 | Japan . | |

Primary Examiner—A. T. Grimley
Assistant Examiner—Nestor R. Ramirez
Attorney, Agent, or Firm—Wenderoth, Lind & Ponack

[57] ABSTRACT

When a pen holder of a drawing head of an automatic lead supply apparatus is raised and lowered, and a knocking pipe of a pencil holder held by the pen holder strikes or is pressed against a knocking plate in order to repeatedly raise and lower the knocking pipe, a lead contained in the pencil holder is fed to a front end of the pencil holder. Before the lead feeding operation, a controller functions to finely oscillate the drawing head in order to prevent the lead from clogging the knocking pipe. As a result, a single lead will be properly and reliably guided to a lead chucking mechanism.

8 Claims, 4 Drawing Sheets

AUTOMATIC LEAD SUPPLY APPARATUS FOR PLOTTER

BACKGROUND OF THE INVENTION

The present invention relates to an automatic lead supply apparatus for a plotter (or automatic drafting machine).

Lead has been supplied by moving a pencil holder held by the pen holder of a drawing head to a lead supply and discharge position and performing a knocking operation on the pencil holder, as disclosed in Japanese Patent Application Laid-Open No. 2-29399.

In the above-mentioned knocking operation, a plurality of leads housed in the knocking pipe of the pencil holder have often become caught in the vicinity of a chuck port 66a above a chuck portion, as shown in FIG. 4. Therefore, it has been impossible to supply the leads when this occurs. This phenomenon is especially prevalent when a main body of the plotter is inclined. Thus, it has generally been impossible to supply the lead when the plotter main body is inclined.

SUMMARY OF THE INVENTION

An object of the present invention is to overcome the above-mentioned problem.

This object is attained by providing an automatic lead supply apparatus for a plotter, comprising: a Y-rail; a drawing head mounted for movement along the Y-rail; a pen holder mounted to the drawing head; a multi-lead knocking type pencil holder engaged with the pen holder; and an oscillation mechanism for oscillating the pencil holder along a longitudinal direction of the Y-rail. The pencil holder includes a chuck member, a knocking pipe, a lead housing port, and a lead guiding member for guiding lead from the lead housing port to the chuck member.

DESCRIPTION OF THE PREFERRED EMBODIMENT

Figure 1:
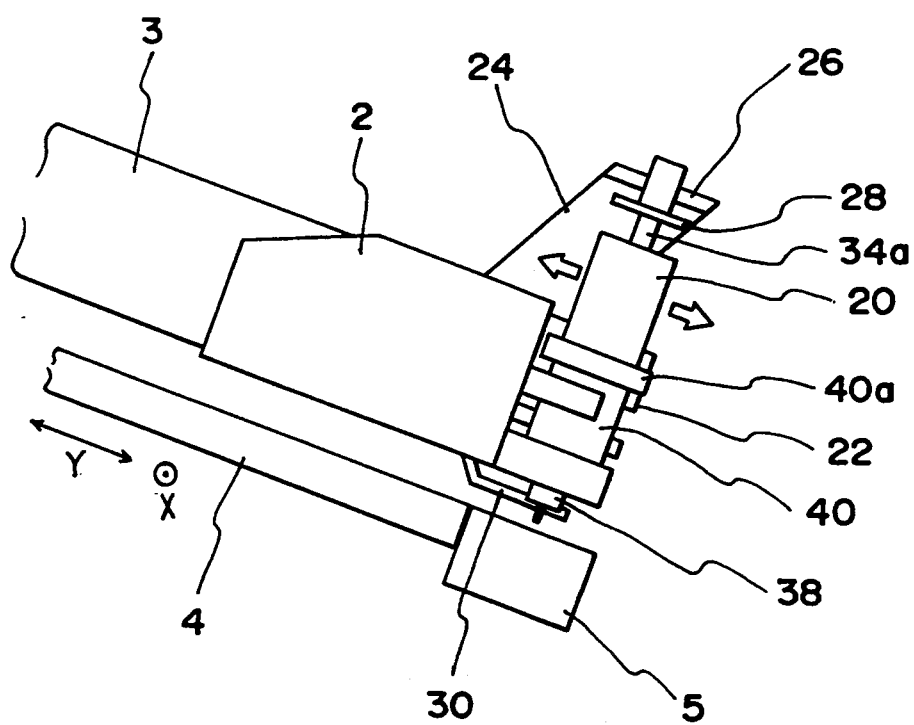
FIG. 1 is a side view of a plotter according to the present invention.

The construction of the present invention will be described in detail hereinafter by referring to an embodiment shown in the accompanying drawings.

A drawing head 2 of an XY plotter is supported so as to be relatively movable in X and Y directions (i.e. X and Y directions being perpendicular axes) along a sheet of paper 6 disposed on a paper mounting member 4 and movable on the Y rail 3 of the XY plotter. The Y rail 3 is driven in the X direction on the paper mounting member 4 by an X motor 74 shown in FIG. 3. The drawing head 2 is constructed to be driven in the Y direction along the Y rail 3 by a Y motor 76. The plotter may be a paper driving type wherein the Y rail is fixed and the paper sheet on the paper mounting member is fed in the X direction by a pinch roller mechanism driven by the X motor. The X and Y motors 74 and 76 are connected to the control part of a controller 82 through a driver and a switching or change over means 78. A lifting driver 10 consisting of a moving coil is fixed on a base of the drawing head 2. A known pen holder 22 for detachably holding a knocking type pencil holder 20 is provided in the lifting output member of the driver 10. An upper knocking plate 26 is fixed to an attaching plate 24 which extends upwardly from the base. The upper knocking plate 26 is disposed above the flange of the pencil holder 20 held by the pen holder 22. A knocking pipe 34a of the pencil holder 20 is idly fitted into a front opened groove hole of the upper knocking plate 26. A lower knocking plate 30 is fixed to the base and serves to guide a pencil lead displacing pipe 38 of the pencil holder 20. An end protrusion 38a of the displacing pipe 38 is slidably fitted into a front opened groove hole of the lower knocking plate 30. The lower horizontal face of the displacing pipe 38 is designed to engage with a stepped horizontal face formed in the circumference of the groove hole of the knocking plate 30. A stocker for holding a plurality of knocking type pen holders is disposed on the body of the XY plotter. The stocker and the pen holder 22 of the drawing head 2 can mutually and automatically exchange pencil holders. The automatic exchanging construction for the pencil holders is well known and the gist of the present invention does not reside therein, so that the illustration and explanation thereof has been omitted.

The structure of the knocking type pencil holder 20 will be described in the following with reference to FIG. 2.

Figure 2:
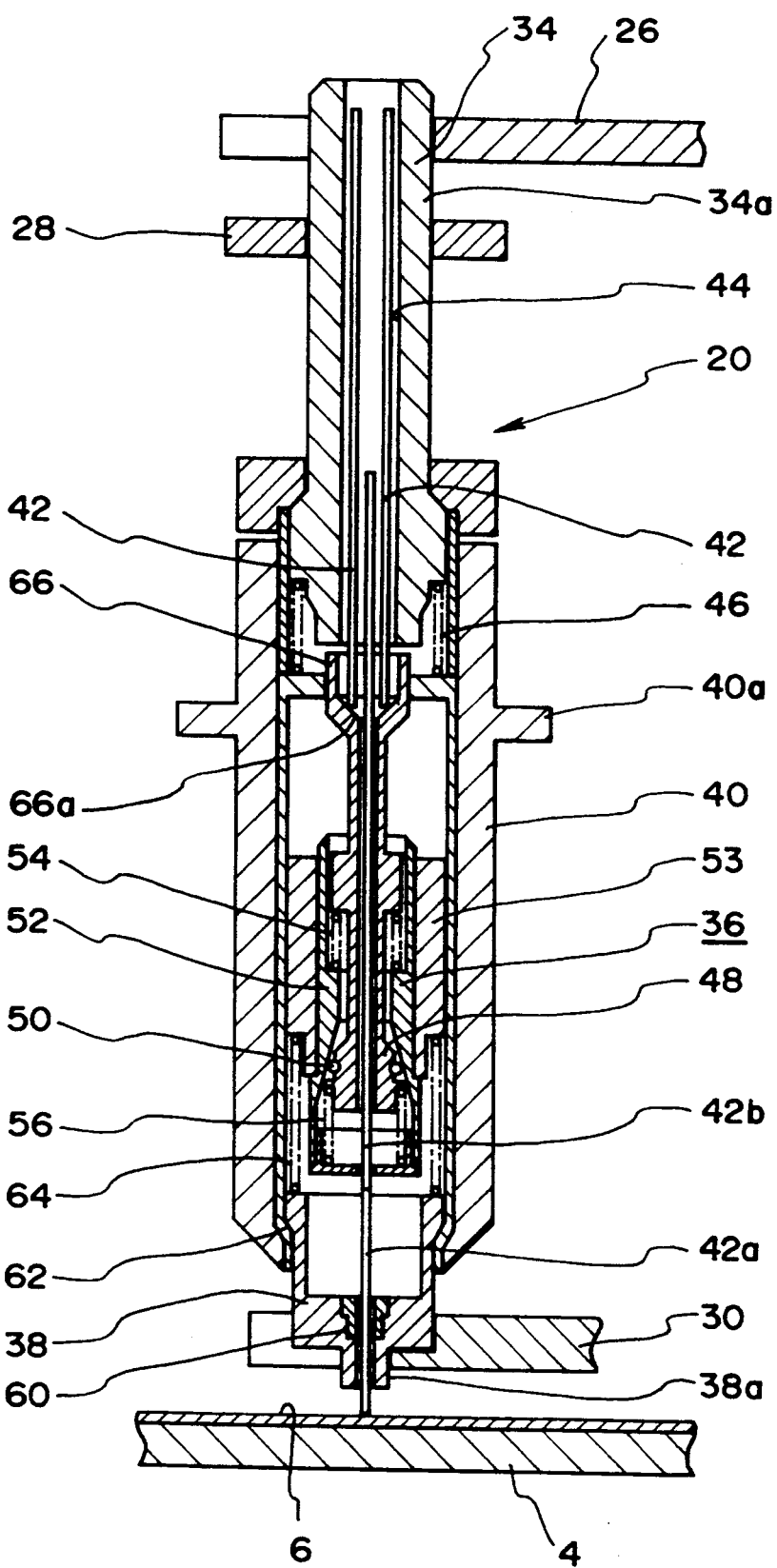
FIG. 2 is a sectional view of a pencil holder of the present invention.

In FIG. 2, 34 is a knocking mechanism, 36 is a lead chuck mechanism, 38 is the pencil lead displacing pipe and 40 is a case. The knocking mechanism 34 comprises the knocking pipe 34a provided with a lead passage 44 for holding a plurality of pencil leads 42, and a knocking spring 46. The lead chuck mechanism 36 comprises a split chuck member or collet chuck 48, balls 50 attached to the chuck member 48, a chuck case 52 fixed to an inner case 62 through a tubular body 53, and two chuck springs 54 and 56. The chuck member 48 presses and holds the leads 42 in the lead passage due to the resilient force of the chuck springs 54 and 56. The pencil lead displacing pipe 38 is formed on the end of the pencil holder 20, and a rubber ring 60 for holding the pencil lead with a suitable friction force is provided at its prescribed position. The frictional holding power of the rubber ring 60 with respect to the pencil lead is set higher than the resiliency of a spring 64 which is apt to depress the displacing pipe 38 relative to the case 40. The inner case 62 fixed to the case 40 engages with the pencil lead displacing pipe 38. The pencil lead displacing pipe 38 is supported so as to be vertically slidable and urged downwardly by the spring 64. A collar part 40a is formed on the case The operation of the knocking type pencil holder will be described in the following. One lead held in the lead passage 44 is received in the chuck port 66a of a funnel shaped lead guiding member 66 formed above the lead chuck mechanism 36. The pencil lead 42 moved from the passage 44 is referred to as a first pencil lead 42a herein. When the knocking mechanism 34 is vertically operated once or a plurality of times, namely, the chuck member 48 opens or performs a chucking action, the first pencil lead 42a is chucked or held by the chuck member 48 of the lead chuck mechanism 36. At this time, the end of the first pencil lead 42a generally abuts against the upper end of the rubber ring 60 of the pencil lead displacing pipe 38. From this state, the pencil lead displacing pipe 38 is vertically moved. As a result, the first pencil lead 42a is gradually supplied or drawn out. In other words, the lead chuck mechanism 36 of this pencil holder 20 is constructed so that it provides an extremely strong holding power for holding the leads in the directions in which the leads are dispensed and pushed back while the lead chuck mechanism 36 chucks the pencil lead. When the pencil lead displacing pipe 38 moves upward, the first pencil lead 42a is not displaced because it is chucked by the chuck member 48. Therefore, the pencil lead displacing pipe 38 is displaced relative to the first pencil lead 42a. When the chuck member 48 is released from this state, the pencil lead displacing pipe 38 is returned to its original position by the resilient force of the spring 64. This causes the first pencil lead 42a to be drawn out by a distance corresponding to one vertical stroke of the displacing pipe 38 due to the friction force of the rubber ring 60.

The protrusion of the first pencil lead 42a from the end of the pencil holder 20 enables a recording or drafting operation to be carried out. During recording, when the first pencil lead 42a has been consumed or shortened and the rear end thereof has moved forwardly of the front end of the lead chuck mechanism 36, as shown in FIG. 2, the recording cannot be continued. In such a case, a part of the first pencil lead 42a, namely, the remaining lead must be removed.

Since the lead chuck mechanism 36 of the pencil holder of this reference example has such a construction that its chucking and opening operations are conducted at a fixed position to attain a desirable recording quality, it does not perform a supply operation of pencil lead. Accordingly, when the first pencil lead 42a is consumed and the rear end thereof has moved forwardly of the lead chuck mechanism 36, a second pencil lead 42b following the first pencil lead is chucked by the lead chuck mechanism 36, and the first pencil lead 42a cannot be removed by operating the knocking mechanism 34. This is because the first pencil lead 42a is supported with a prescribed friction force by the rubber ring 60 of the pencil lead displacing pipe 38.

Now, it is assumed that the first pencil lead 42a and the second pencil lead 42b are brought into a state as shown in FIG. 2; namely, the first pencil lead 42a is spaced forwardly of the lead chuck mechanism 36 and the second pencil lead 42b comes into contact with the rear end of the first pencil lead 42a. The pencil lead displacing pipe 38 is pushed up by a prescribed amount against the resilient force of the coupling spring 64 such that the first pencil lead 42a supported by the friction force of the rubber ring 60 would, if the second pencil lead 42b were not present, rise by a prescribed amount with the pencil lead displacing pipe 38. However, since the second pencil lead 42b is in abutment with the rear end of the first pencil lead 42a and is chucked by the lead chuck mechanism 36, the first pencil lead 42a will not rise and is rather retained at its position. The first pencil lead 42a, therefore, protrudes relative to the pencil lead displacing pipe 38. At that time, when the pencil lead displacing pipe 38 is returned to the original position, a prescribed space (corresponding to the amount by which the pencil lead displacing mechanism 38 rises) is produced between the rear end of the first pencil lead 42a and the second pencil lead 42b. From this state, the knocking pipe 34a is depressed. As a result, the lead chuck mechanism 36 is opened and the second pencil lead 42b drops due to its own weight to move into contact with the rear end of the first pencil lead 42a. These two operations, namely, the depressing operation of the pencil lead displacing mechanism 38 and the depressing operation of the knocking mechanism 34 are successively repeated, so that the first pencil lead 42a can be removed.

A lead supply operation will now be described.

When a controller detects the absence of lead, the drawing head 2 is moved to a lead supply and discharge position. Then, the controller drives the Y motor 76 in normal and reverse directions to swiftly oscillate the drawing head 2 little by little in the Y direction along the Y rail. In case of a flat bed type plotter wherein the drawing head 2 is movable in the X and Y directions, the oscillation of the drawing head 2 is not limited specifically to the Y direction. In case of a paper driving type plotter wherein the Y rail is fixed, however, the drawing head 2 oscillates together with its movement along the Y rail. Even when a plurality of leads 42 housed in the knocking pipe 34a in FIG. 2 are caught in the vicinity of the chuck port 66a above the chuck member 48, the oscillation of the drawing head 2 will cause one lead to drop into the chuck member 48.

After that, the controller drives the lifting driver 10 to lift the pencil holder 20 and imposes a knocking movement on the knocking pipe 34a and the pencil lead displacing pipe 38 to supply the lead to the chuck mechanism. The lead may be supplied to the chuck mechanism by the knocking movement of only the knocking pipe 34a by a known means without provision of the lead displacing pipe 38.

Figure 3:
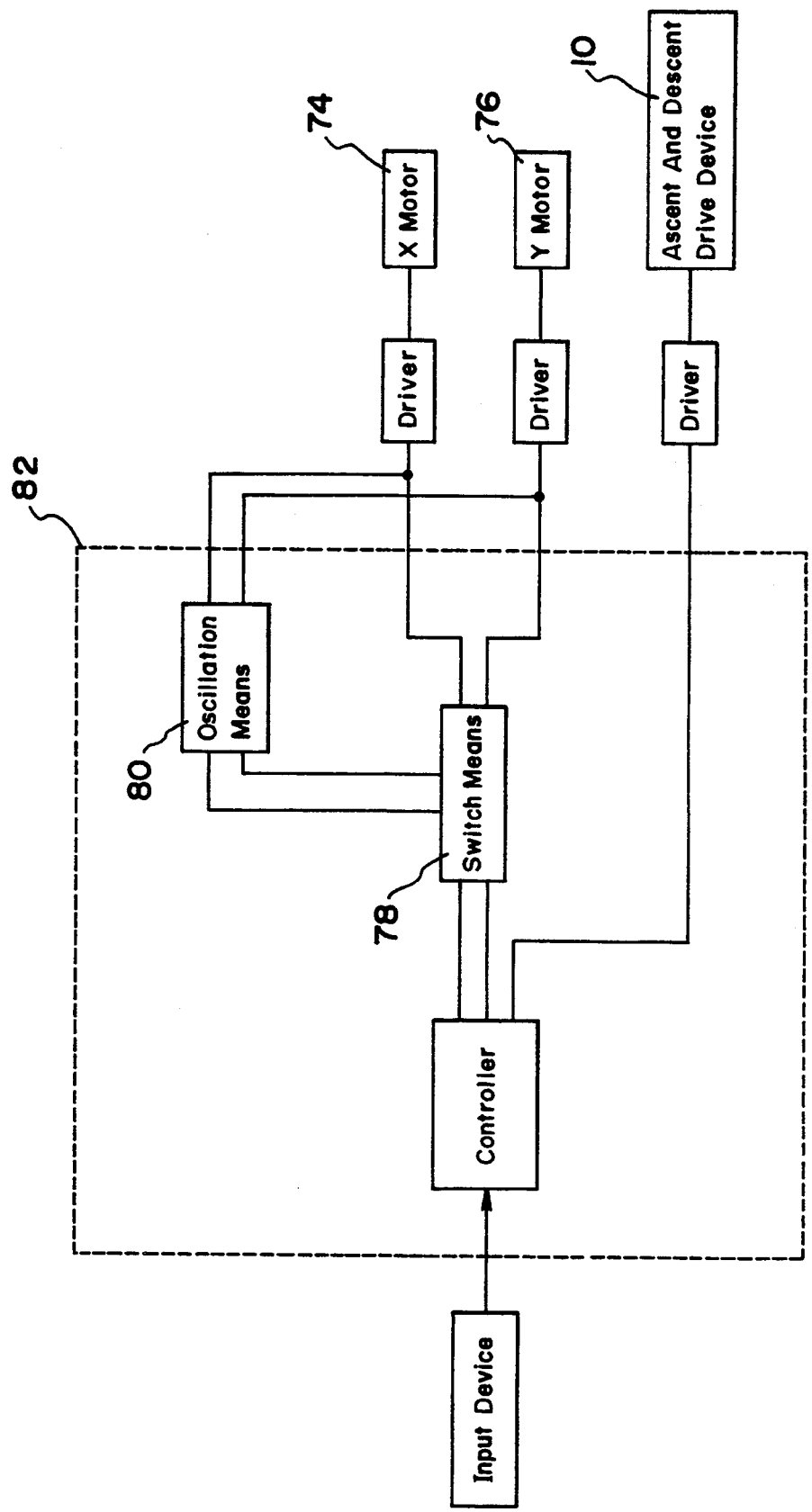
FIG. 3 is a block circuit diagram of the apparatus.
Figure 4:
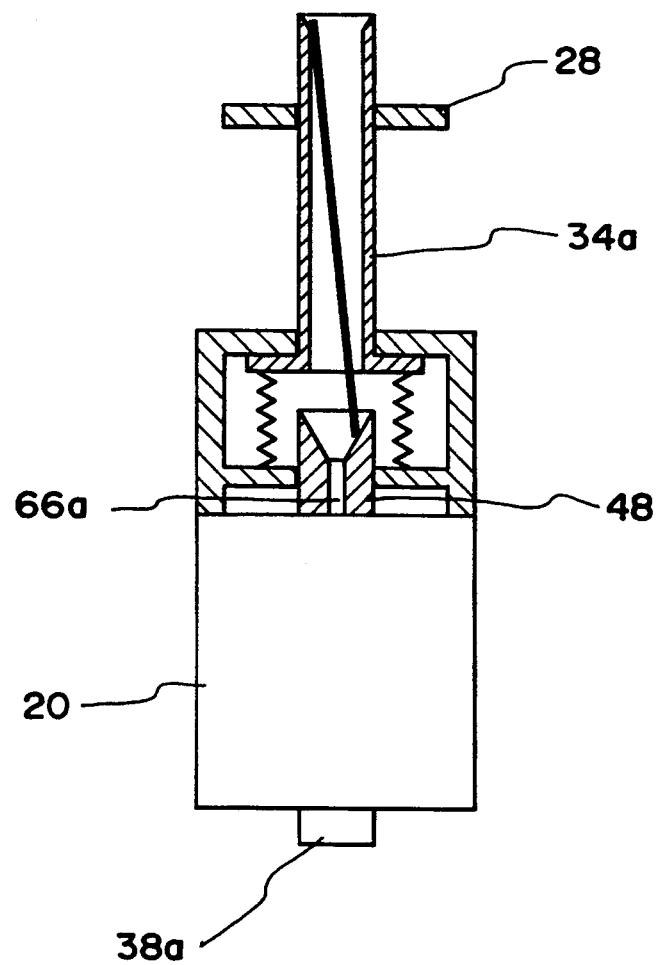
FIG. 4 is an explanatory sectional view of a conventional pencil holder.

The drawing head 2 oscillates in a manner as mentioned below with reference to FIG. 3. An oscillating means 80 is connected to a controller of a control section 82 by a switching means 78. The output of an oscillation means 80 is supplied to the drivers of the X and Y motors 74 and 76 in response to the control signal from the controller. Then, the drawing head 2 is oscillated in the longitudinal direction of the Y rail.

An operation for supplying lead after detection of the absence of the lead will now be further specifically described.

When the lead held by the lead friction holding part of the pencil lead displacing pipe 38 becomes short, the operation shifts to a lead deliver operation and the lifting movement of the case 40 relative to the knocking pipe 34a (i.e. a knocking operation) is repeated. When this knocking operation is carried out by the upper knocking plate 26, a new long lead chucked by the lead chuck mechanism 36 is released from the chuck mechanism 36 and drops due to its own weight. The lower end of the long lead abuts the upper end of the short lead or the remaining lead. Where the remaining lead does not exist, the new (long) lead abuts against the upper end of the lead friction holding part of the pencil lead displacing pipe 38. Next, when the pencil lead displacing pipe 38 is pushed up relative to the case 40 by the lower guide plate 30, the remaining lead 42a engaged with the long lead 42b which is chucked by the lead chuck mechanism 36 is delivered downward in the pencil lead displacing pipe 38 by an amount corresponding to the stroke length of the pencil lead displacing pipe 38. Then, when the case 40 is raised, the pencil lead displacing pipe 38 is released from the pressure of the lower guide plate 30 and moves to a position in which it protrudes from the case 40 due to the resilient force of the spring 64 with the remaining short lead left. This movement of the pencil lead displacing pipe 38 produces a space of the same length as the stroke of the pencil lead displacing pipe 38. When the case 40 is further raised relative to the knocking pipe 34a due to engagement of the knocking pipe 34a with the upper knocking plate 26 to release the lead chuck mechanism 36, the long lead is delivered downward to a position where it collides with the remaining lead due to its own weight. When the abovementioned operations are repeated, the long lead is pressed into the lead friction holding part of the pencil lead displacing pipe 38 and the remaining lead is pushed out by the long lead and released from the pencil lead displacing pipe 38 to drop downward. After the long lead is pressed into the lead friction holding part of the pencil lead displacing pipe 38, the pencil lead displacing pipe 38 remains in a retracted position toward the interior of the case 40, even when the upward force of the lower guide plate 30 against the pencil lead displacing pipe 38 is released. The retracted state of the pencil lead displacing pipe 38 is maintained until the knocking pipe 34a engages with the upper knocking plate 26 to release the lead chuck mechanism 36. The controller recognizes whether or not the pencil lead displacing pipe 38 protrudes by a prescribed amount from the end of the case 40 prior to the engagement of the knocking pipe 34a with the upper knocking plate 26, based on the output of a sensor (not shown). The controller recognizes that the lead supply operation is completed when the pencil lead displacing pipe 38 does not protrude by a prescribed amount, namely, it is retracted. In case the remaining lead is not initially present, the long lead is pressed into the lead friction holding part of the pencil lead displacing pipe 38. When the case 40 is raised from this state relative to the knocking pipe 34a, the retracted state of the pencil lead displacing pipe 38 relative to the case 40 is detected by the sensor before the knocking pipe 34a engages with the upper knocking plate 26, whereby the completion of the lead supply operation is recognized by the controller.

As mentioned above, since the pencil holder is oscillated and leads housed in the knocking pipe of the pencil holder can be guided to the chuck port of the pencil holder without the provision of a new mechanism for discharging a lead remaining in the pencil holder and holding a long lead in the lead friction holding part in the pencil lead displacing pipe of the pencil holder, the lead can be properly supplied and discharged even when a plotter main body is inclined, which was not possible in the prior art.

What is claimed is:

1. An automatic lead supply apparatus for a plotter having a linear Y-rail and a Y-motor for moving a drawing head along the linear Y-rail, said apparatus comprising:
   a pen holder adapted to be mounted to the drawing head so as to be movable therewith along the Y-rail;
   a multi-lead knocking type pencil holder engaged with said pen holder for movement therewith along the Y-rail, said pencil holder including a chuck member, a knocking pipe, a lead housing part, and a lead guiding member for guiding lead from said lead housing part to said chuck member; and
   oscillation means for operating the Y-motor to move the drawing head back and forth along the Y-rail to cause oscillation of said pencil holder along a longitudinal direction of the Y-rail during a lead feeding operation.

2. An automatic lead supply apparatus as recited in claim 1, wherein
   said lead guiding member is funnel shaped.

3. An automatic lead supply apparatus as recited in claim 2, wherein
   said lead housing part comprises a lead passage formed through said knocking pipe.

4. An automatic lead supply apparatus as recited in claim 1, wherein
   said lead housing part comprises a lead passage formed through said knocking pipe.

5. An automatic lead supply apparatus for a plotter, said apparatus comprising:
   a linear Y-rail;
   a drawing head mounted to said Y-rail for movement therealong;
   a Y-motor operably coupled with said drawing head to move said drawing head along said Y-rail;
   a pen holder mounted to said drawing head for movement therewith along said Y-rail;
   a multi-lead knocking type pencil holder engaged with said pen holder for movement therewith along said Y-rail, said pencil holder including a chuck member, a knocking pipe, a lead housing part, and a lead guiding member for guiding lead from said lead housing part to said chuck member; and
   oscillation means for operating said Y-motor to move said drawing head back and forth along said Y-rail to cause oscillation of said pencil holder along a longitudinal direction of said Y-rail during a lead feeding operation.

6. An automatic lead supply apparatus as recited in claim 5, wherein
   said lead guiding member is funnel shaped.

7. An automatic lead supply apparatus as recited in claim 6, wherein
   said lead housing part comprises a lead passage formed through said knocking pipe.

8. An automatic lead supply apparatus as recited in claim 5, wherein
   said lead housing part comprises a lead passage formed through said knocking pipe.

* * * * *